United States Patent
Miller et al.

(10) Patent No.: US 11,105,664 B2
(45) Date of Patent: Aug. 31, 2021

(54) APPARATUS AND METHOD FOR CREATING INFERENTIAL PROCESS FLOW MEASUREMENTS USING FLOW RESTRICTOR AND UPSTREAM AND DOWNSTREAM PRESSURE MEASUREMENTS

(71) Applicant: Honeywell International Inc., Morris Plains, NJ (US)

(72) Inventors: Randy M. Miller, Thousand Oaks, CA (US); Paul A. Sweeney, Naperville, IL (US); Nestor J. Perozo Piña, Katy, TX (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 361 days.

(21) Appl. No.: 15/816,169

(22) Filed: Nov. 17, 2017

(65) Prior Publication Data
US 2018/0274956 A1   Sep. 27, 2018

Related U.S. Application Data

(60) Provisional application No. 62/475,765, filed on Mar. 23, 2017.

(51) Int. Cl.
*G01F 25/00* (2006.01)
*G01F 1/50* (2006.01)
(Continued)

(52) U.S. Cl.
CPC ............... *G01F 1/50* (2013.01); *G01F 1/363* (2013.01); *G01F 15/063* (2013.01);
(Continued)

(58) Field of Classification Search
CPC ........ G01F 1/50; G01F 1/363; G01F 25/0007; G01F 25/0023; G01F 25/0053; G01F 15/063; G01F 15/005; G05D 7/00
(Continued)

(56) References Cited

U.S. PATENT DOCUMENTS 3,252,324 A * 5/1966 Steele ..................... G01F 1/88
                                                        73/861.58
5,298,886 A   3/1994 Ueki et al.
(Continued)

FOREIGN PATENT DOCUMENTS

CN   102997979 A   3/2013
EP   1599773 A1   11/2005
WO   2017/040100 A1   3/2017

OTHER PUBLICATIONS

International Search Report dated Jul. 10, 2018 in connection with International Patent Application No. PCT/US2018/022824, 3 pages.
(Continued)

*Primary Examiner* — Robert R Raevis
(74) *Attorney, Agent, or Firm* — Ortiz & Lopez, PLLC; Kermit D. Lopez; Luis M. Ortiz (57) ABSTRACT

A method includes obtaining pressure measurements associated with fluid that passes through a flow restrictor, where the pressure measurements identify pressures upstream and downstream from the flow restrictor. The method also includes generating estimated flow measurements based on the pressure measurements. The method further includes comparing the estimated flow measurements and actual flow measurements generated by a flow meter that is fluidly coupled to the flow restrictor. In addition, the method includes determining whether a problem exists based on the comparison. The flow restrictor could provide a fixed restriction or a variable restriction for the fluid. An overall loss
(Continued)

coefficient associated with the flow restrictor could be used to generate an estimated flow measurement.

18 Claims, 5 Drawing Sheets

(51) Int. Cl.
  *G01F 1/36*   (2006.01)
  *G01F 15/06*  (2006.01)
  *G05D 7/06*     (2006.01)
  *G01F 15/00*    (2006.01)

(52) U.S. Cl.
  CPC ........ *G01F 25/0007* (2013.01); *G01F 15/005* (2013.01); *G05D 7/0635* (2013.01)

(58) Field of Classification Search
  USPC ......... 73/1.25, 1.26, 1.16–1.35, 861–861.94, 73/215–271, 861.55, 861.56, 861.58; 340/606, 608–611; 702/45–49, 100
  See application file for complete search history.

(56) References Cited

U.S. PATENT DOCUMENTS

| | | | |
|---|---|---|---|
| 5,419,203 A * | 5/1995 | Carmichael | G01F 1/26 73/861.58 |
| 2003/0094052 A1 * | 5/2003 | Zanker | G01F 1/42 73/861.52 |
| 2006/0288799 A1 * | 12/2006 | Kielb | G01F 1/42 73/861.53 |
| 2007/0034018 A1 | 2/2007 | Bell | |
| 2008/0077335 A1 | 3/2008 | Lee et al. | |
| 2008/0115560 A1 | 5/2008 | Shareef et al. | |
| 2009/0125154 A1 | 5/2009 | Yli-Koski | |
| 2010/0080262 A1 | 4/2010 | McDonald | |
| 2013/0186486 A1 | 7/2013 | Ding | |
| 2017/0010625 A1 | 1/2017 | Monkowski et al. | |

OTHER PUBLICATIONS

Written Opinion of the International Searching Authority dated Jul. 10, 2018 in connection with International Patent Application No. PCT/US2018/022824, 7 pages.
International Search Report dated Jun. 28, 2018 in connection with International Patent Application No. PCT/US2018/022845, 3 pages.
Written Opinion of the International Searching Authority dated Jun. 28, 2018 in connection with International Patent Application No. PCT/US2018/022845, 8 pages.
Miller, "Apparatus and Method for Creating Inferential Process Flow Measurements Using Other Process Measurements", U.S. Appl. No. 15/825,382, filed Nov. 29, 2017, 28 pages.
Wikipedia, "Choked Flow", Sep. 2016, 7 pages.
Engineering 360, "Control Valves Information", Jan. 2017, 8 pages.
Industrial Controls, "Controlling Flow with Ball Valves", Dec. 2016, 4 pages.
The Engineering Toolbox, "Flow Coefficients—Cv—and Formulas for Liquids, Steam and Gases—Online Calculators", Jan. 2017, 9 pages.
Process Systems, "Flow Rates for Butterfly Valves—Cv Value", Feb. 2017, 3 pages.
Georgia State University, "Bernoulli Equation", Nov. 2016, 6 pages.
"Applications of the Bernoulli Equation", Nov. 19, 2016, 12 pages.
"Specifying Control Valve Data", Mar. 15, 2017, 6 pages.
Office Action dated Jun. 10, 2020 for corresponding Chinese Application No. 201880018897.7.
European search Report for corresponding EP Application No. 18771859.8.

* cited by examiner

APPARATUS AND METHOD FOR CREATING INFERENTIAL PROCESS FLOW MEASUREMENTS USING FLOW RESTRICTOR AND UPSTREAM AND DOWNSTREAM PRESSURE MEASUREMENTS

CROSS-REFERENCE TO RELATED APPLICATION AND PRIORITY CLAIM

This application claims priority under 35 U.S.C. § 119(e) to U.S. Provisional Patent Application No. 62/475,765 filed on Mar. 23, 2017. This provisional application is hereby incorporated by reference in its entirety.

TECHNICAL FIELD

This disclosure generally relates to measuring fluid flows in industrial process control and automation systems or other systems. More specifically, this disclosure relates to an apparatus and method for creating inferential process flow measurements using a flow restrictor and upstream and downstream pressure measurements.

BACKGROUND

Flow meters are used in a variety of industries to measure the flows of materials through pipes or other structures. For example, hundreds or thousands of flow meters could be used to measure the flows of materials in oil and gas refineries, chemical plants, or other large industrial facilities. Among other things, measurements from flow meters can be used to help control industrial processes, ensure safety of personnel, and prevent discharge of materials into the surrounding environment. The failure of a flow meter can cause disruptions in an industrial process, lead to the creation of safety issues, or allow environmental damage.

SUMMARY

This disclosure provides an apparatus and method for creating inferential process flow measurements using a flow restrictor and upstream and downstream pressure measurements.

In a first embodiment, a method includes obtaining pressure measurements associated with fluid that passes through a flow restrictor, where the pressure measurements identify pressures upstream and downstream from the flow restrictor. The method also includes generating estimated flow measurements based on the pressure measurements. The method further includes comparing the estimated flow measurements and actual flow measurements generated by a flow meter that is fluidly coupled to the flow restrictor. In addition, the method includes determining whether a problem exists based on the comparison.

In a second embodiment, an apparatus includes at least one processing device configured to obtain pressure measurements associated with fluid that passes through a flow restrictor, where the pressure measurements identify pressures upstream and downstream from the flow restrictor. The at least one processing device is also configured to generate estimated flow measurements based on the pressure measurements. The at least one processing device is further configured to compare the estimated flow measurements and actual flow measurements generated by a flow meter that is fluidly coupled to the flow restrictor. In addition, the at least one processing device is configured to determine whether a problem exists based on the comparison.

In a third embodiment, a non-transitory computer readable medium contains instructions that when executed cause at least one processing device to obtain pressure measurements associated with fluid that passes through a flow restrictor, where the pressure measurements identify pressures upstream and downstream from the flow restrictor. The medium also contains instructions that when executed cause the at least one processing device to generate estimated flow measurements based on the pressure measurements. The medium further contains instructions that when executed cause the at least one processing device to compare the estimated flow measurements and actual flow measurements generated by a flow meter that is fluidly coupled to the flow restrictor. In addition, the medium contains instructions that when executed cause the at least one processing device to determine whether a problem exists based on the comparison.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
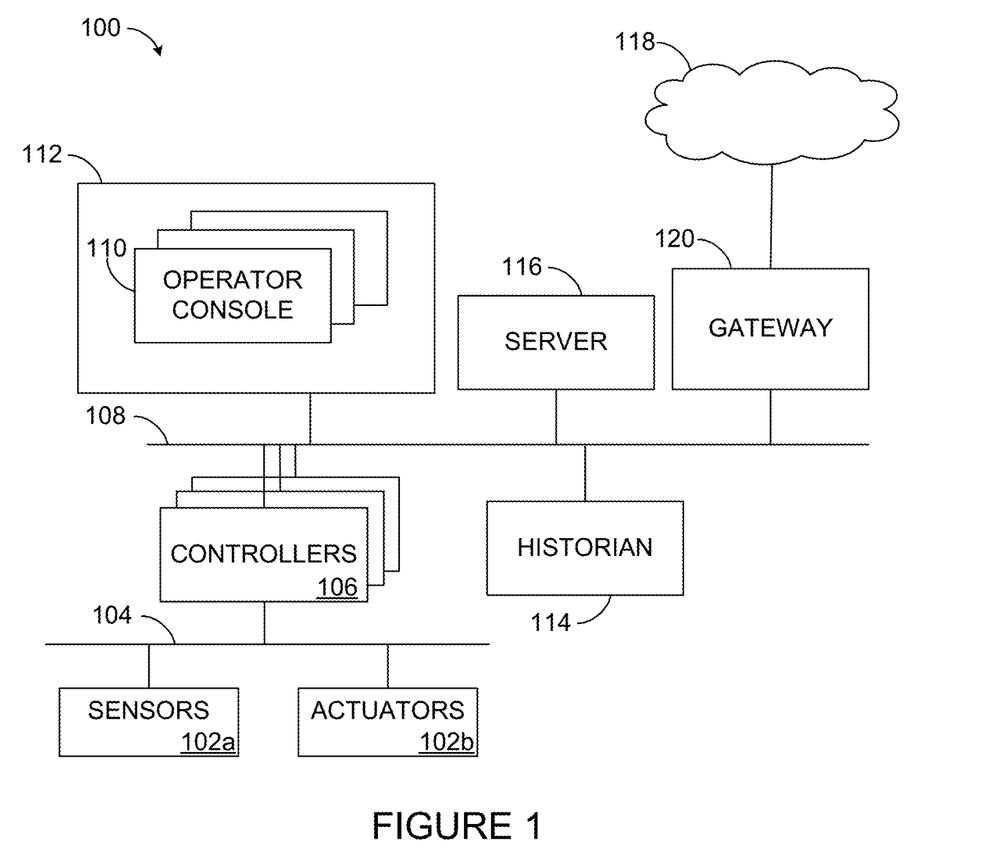
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

The sensors 102a in FIG. 1 include at least one flow meter that captures measurements of flowing material and multiple pressure sensors that capture pressure measurements upstream and downstream of a flow restrictor. As noted above, the failure of a flow meter can cause various problems, such as disruptions in an industrial process, safety issues, or environmental damage.

In accordance with this disclosure, measurements from the pressure sensors can be used to verify whether the flow meter is operating correctly. For example, a controller 106, operator console 110, server 116, or computing cloud 118 could use a model associated with the flow restrictor and pressure measurements captured upstream and downstream of the flow restrictor to estimate the flow of material through the flow restrictor. The actual flow measurements generated by the flow meter could be compared with the estimated flow measurements to determine whether a problem exists.

In this way, a flow meter can have a digital "twin" that is used to help validate the flow measurements from the flow meter. If the flow meter begins to experience a problem, the existence of the problem could be identified. It is also possible that the flow meter could be operating correctly and that another component (such as one or more of the pressure sensors) could be suffering from a problem. It is further possible that a model or other parameter(s) of the flow estimation algorithm need to be recalculated, tuned, or otherwise updated so that the flow estimation algorithm functions more accurately. In any case, any suitable corrective action(s) could occur, such as generating a warning or alarm or scheduling maintenance. If the flow meter fails, the digital twin of the flow meter can be used until the flow meter is replaced or repaired.

This approach can therefore help to reduce disruptions in an industrial process, safety issues, and environmental damage. Moreover, this approach could be replicated for some or all of the flow meters associated with one or more industrial processes. For example, this approach could be used for all critical flow meters in an industrial process or for all flow meters in an industrial process. Additional details regarding this approach are provided below.

As a particular application example, this approach can be used to estimate flow measurements that are required for environmental reporting. This approach allows for the creation of a "one out of two" diagnostic (1oo2D) voting capability for flow measurements without requiring additional instruments. The primary measurements could come from the flow meter, and the secondary measurements could be estimated using the upstream and downstream pressures. A user can be alerted when a mismatch between the measurements exceeds a threshold, and the user may choose to use either the primary measurements or the secondary measurements while investigating the cause of the difference. Another example application can include use in custody transfer metering where oil or other material is transferred between parties. The estimated flow measurements could be used as an indicator of gross error in a flow meter's actual measurements. Still other applications could include use with key plant balance flow meters and flow meters used as inputs for advanced control or optimization.

Note that any suitable flow restrictor could be used here with the pressure measurements. Example flow restrictors could include one or more valves, flow orifices, orifice plates, or pipe fittings or any combination thereof. In general, a "flow restrictor" refers to any device or combination of devices that provides flow restriction for fluid in a passageway. As long as there is a measurable response in the pressure of the fluid when passing through the device or combination of devices, such device or combination of devices can function as a flow restrictor here. It should also be noted that various types of flow meters could be used here and have their measurements validated using the upstream and downstream pressure measurements. Example flow meters could include mechanical, pressure-based, optical, open-channel, thermal mass, vortex, sonar, electromagnetic, ultrasonic, Coriolis, or laser Doppler flow meters. It should further be noted that the flow restrictor for which the upstream and downstream pressure measurements are captured could be separate from the flow meter or form a part of the flow meter being validated.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where at least one flow meter can be monitored. This functionality can be used in any other suitable system, and that system need not be used for industrial process control and automation.

Figure 2:
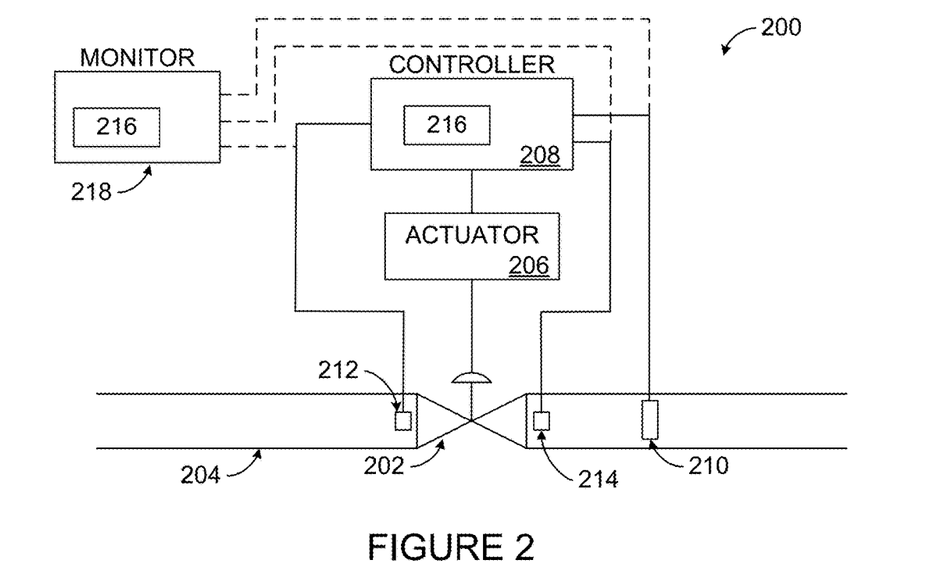
FIG. 2 illustrates an example system supporting inferential process flow measurements using a flow restrictor and upstream and downstream pressure measurements according to this disclosure.

FIG. 2 illustrates an example system 200 supporting inferential process flow measurements using a flow restrictor and upstream and downstream pressure measurements according to this disclosure. For ease of explanation, the system 200 may be described as being used within the industrial process control and automation system 100 of FIG. 1. However, the system 200 could be used for any other suitable function, and the system 200 need not relate to industrial process control and automation.

As shown in FIG. 2, the system 200 includes a flow restrictor, which in this example denotes a valve 202, positioned within or otherwise associated with a pipe 204. The valve 202 denotes any suitable structure configured to control the flow of material. The pipe 204 denotes any suitable structure configured to transport material. The material could include any suitable fluid, such as one or more liquids or gases. The system 200 also includes an actuator 206, which can alter the setting (opening or position) of the valve 202 in order to alter the flow of material through the pipe 204. The actuator 206 includes any suitable structure for altering a valve or other structure in order to adjust a flow of material. A controller 208 processes input data and generates control signals for the actuator 206. The controller 208 therefore operates to control the actuator 206 (and indirectly the valve 202) in order to control the flow of material through the pipe 204. The controller 208 includes any suitable structure for generating control signals for an actuator in order to control a flow of material.

The system 200 also includes various sensors 210-214. The sensor 210 denotes a flow meter that is configured to measure a flow of material through the pipe 204. The sensor 210 is disposed in the same flow path as the valve 202 with no additions or deviations for fluid between the valve 202 and the sensor 210. The sensor 210 can therefore generate measurements of the material flowing through the valve 202. The sensor 210 includes any suitable structure for measuring a flow of material, such as one or more mechanical, pressure-based, optical, open-channel, thermal mass, vortex, sonar, electromagnetic, ultrasonic, Coriolis, or laser Doppler flow meters.

The sensors 212 and 214 denote pressure sensors that are configured to measure pressure at specific points in the pipe 214. The sensors 212 and 214 are disposed in the same flow path as the valve 202. In some cases, the sensors 212 and 214 could be close enough to the valve 202 so that no significant pressure perturbations can interfere with perturbations caused by the interaction between the fluid flow and the valve 202. In these cases, the sensors 212 and 214 could generate pressure measurements at or near the inlet and the outlet of the valve 202. In other instances, each of the sensors 212 and 214 could be located in a position where, between that position and the valve 202, no additions or diversions of material are made. Each sensor 212 and 214 includes any suitable structure for measuring a pressure.

The measurements from the sensor 210 are provided to the controller 208. The controller 208 uses the measurements from the sensor 210 to control the operation of the actuator 206. For example, the controller 208 could use the measurements from the sensor 210 to determine whether an actual flow of material through the pipe 204 is at a desired setpoint, is too high (above the setpoint), or is too low (below the setpoint). The controller 208 could then control the actuator 206 in order to adjust the valve 202 and change the flow rate through the pipe 204 if needed.

In some embodiments, the measurements from the sensors 212 and 214 are also provided to the controller 208. The controller 208 can use the pressure measurements from the sensors 212 and 214 along with at least one model 216 to estimate what the flow measurements from the sensor 210 should be. If the estimated flow measurements are different from the actual flow measurements (such as by a threshold amount or percentage for a specified amount of time), this could be indicative of a problem (such as with the sensor 210 or other component), and the controller 208 may generate a warning or alarm or take other suitable action. If the sensor 210 actually fails, the controller 208 could use the estimated flow measurements until the sensor 210 is repaired or replaced.

Each model 216 represents one or more characteristics of the valve 202 that affect or are used to calculate flow of material through the valve 202. For example, as described in more detail below, a flow restrictor (such as the valve 202) has a coefficient of velocity (denoted $C_v$) that is used to calculate the velocity of fluid exiting the flow restrictor. The coefficient of velocity $C_v$ generally varies based on the size of the opening of the flow restrictor (such as the position of the valve 202). A model 216 could be used to represent how the coefficient of velocity $C_v$ varies based on the opening or position of the flow restrictor. This type of model 216 could take various forms, such as a transfer function, one or more linear/polynomial equations, or a look-up table. It should be noted, however, that other values associated with the valve 202 or other flow restrictor could be used, such as its overall loss coefficient (which is often expressed in terms of the coefficient of velocity for valves). The overall loss coefficient could be used in the model 216.

Note that this functionality could also be implemented in other ways. For example, the measurements from the sensors 210-214 could be provided to an external monitor 218 (which could denote a local or remote server 116 or a remote computing cloud 118). The external monitor 218 could use the model 216 and the measurements from the sensors 210-214 to verify proper operation of the sensor 210 and other components. If a problem is detected, a notification identifying the issue could be sent to one or more users, such as for display on one or more operator consoles 110. As another example, the measurements from the sensors 212 and 214 could be provided to the external monitor 218, and the external monitor 218 could use the model(s) 216 and the measurements from the sensors 212 and 214 to estimate flow measurements through the valve 202 or other flow restrictor. The estimated flow measurements could then be provided to one or more operator consoles 110, the server 116, or other destination(s) for comparison to the actual flow measurements obtained from the sensor 210.

Also note that while a valve 202 is shown as being used here, this is not required. For example, any flow restrictor that restricts the flow of fluid through the pipe 204 could be used, and pressure measurements upstream and downstream of the flow restrictor could be captured and used to calculate flow measurements. A flow restrictor generally refers to any structure having a fixed or variable opening that is narrower than a surrounding structure. As a result, fluid flowing through a surrounding structure enters the narrower opening, creating a change in the fluid's pressure and velocity. Other types of flow restrictors could include flow orifices, orifice plates, or pipe fittings. When a fixed flow restrictor is used, there is likely no need for an actuator 206 since the flow restrictor's opening cannot be altered, and the controller 208 need not be used to control the actuator 206 (although the controller 208 could still be used to calculate estimated flow measurements and to compare actual and estimated flow measurements).

Although FIG. 2 illustrates one example of a system 200 supporting inferential process flow measurements using upstream and downstream pressure measurements, various changes may be made to FIG. 2. For example, the system 200 shown here could be used to monitor any number of flow meters. Also, the functionality for monitoring the operation of one or more flow meters could be implemented in any other suitable manner. In addition, the flow meter 210 could be placed on either side of the valve 202 or in another location as long as the flow meter 210 can measure the amount of material flowing through the valve 202.

Figure 3:
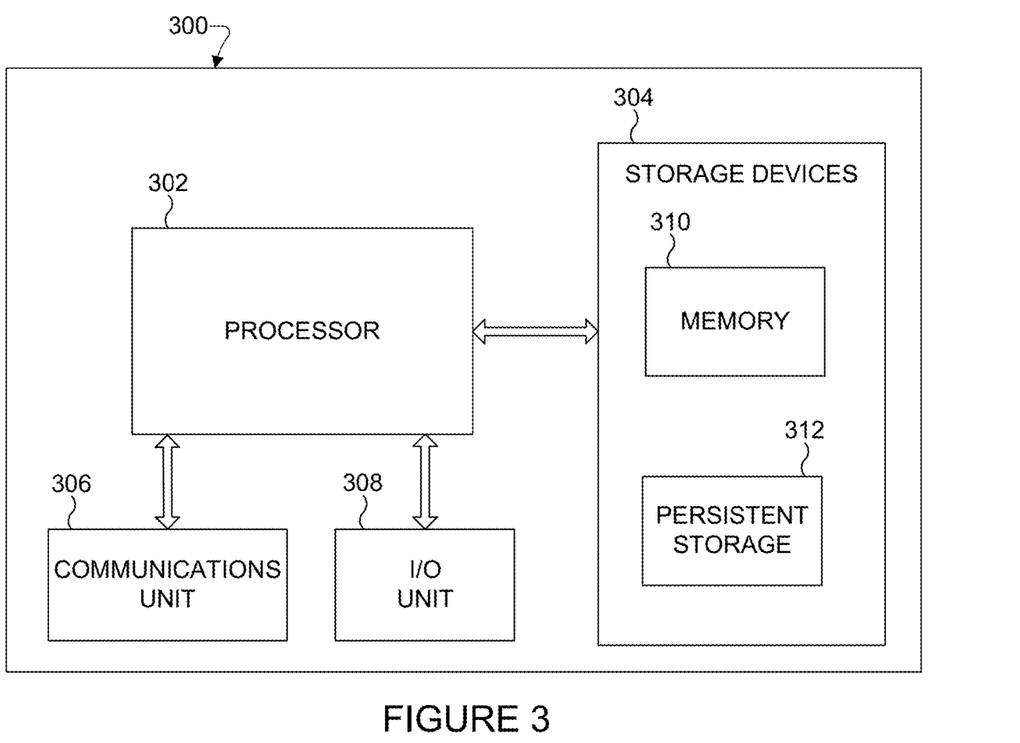
FIG. 3 illustrates an example device for creating inferential process flow measurements using a flow restrictor and upstream and downstream pressure measurements according to this disclosure.

FIG. 3 illustrates an example device 300 for creating inferential process flow measurements using a flow restrictor and upstream and downstream pressure measurements according to this disclosure. The device 300 could, for example, denote any of the components 106, 110, 116, 208, 218 described above with respect to FIGS. 1 and 2. However, the device 300 could be used in any other suitable system.

As shown in FIG. 3, the device 300 includes at least one processor 302, at least one storage device 304, at least one communications unit 306, and at least one input/output (I/O) unit 308. Each processor 302 can execute instructions, such as those that may be loaded into a memory 310. The instructions could implement the flow meter monitoring functionality described in this patent document. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 for creating inferential process flow measurements using upstream/downstream pressure measurements, various changes may be made to FIG. 3. For example, components could be added, omitted, combined, further subdivided, or placed in any other suitable configuration according to particular needs. Also, computing devices can come in a wide variety of configurations, and FIG. 3 does not limit this disclosure to any particular configuration of computing device.

The following denotes one specific example implementation for using upstream and downstream pressure measurements in order to estimate flow measurements for material flowing through a valve. Note that the specific details provided below relate to an implementation involving a specific valve in a specific system and that other implementations can vary as needed or desired. Also note that, as described above, other flow restrictors (such as orifice plates) could be used, and the flow restrictors may or may not be adjustable.

The Bernoulli equation relates to the conservation of energy in flowing fluids. For example, the energy in a flowing fluid at a first point of the pipe 204 should be equal to the energy in the flowing fluid at a second point of the pipe 204 (assuming no energy or fluid losses occur between the two points). Assume that the fluid has a velocity $V_0$ and a pressure $P_0$ at the first point and a velocity $V_1$ and a pressure $P_1$ at the second point. The Bernoulli equation indicates that:

$$h_0 + \frac{P_0}{\rho g} + \frac{V_0^2}{2g} = h_1 + \frac{P_1}{\rho g} + \frac{V_1^2}{2g} + \Delta h_f + \Delta h_m \tag{1}$$

$$\Delta h_f + \Delta h_m = K_{OL} \frac{V^2}{2g} \tag{2}$$

where $h_0$ and $h_1$ denote the elevations of the flow paths at both points, $\rho$ denotes the density of the fluid, and g denotes gravitational acceleration. Also, $\Delta h_f$ denotes frictional head losses, and $\Delta h_m$ denotes miscellaneous head losses. Further, $K_{OL}$ is the overall loss coefficient for the fluid pathway between the two points (including the effect of a flow restrictor), and V denotes the velocity through the pipe segment. Given this, an increase in the velocity ($V_1 > V_0$) corresponds to a decrease in pressure ($P_1 < P_0$). Thus, when a fluid passes through a valve opening or other flow restrictor, the fluid velocity increases but the fluid pressure decreases.

One application of the Bernoulli equation is to estimate the flow of material through an orifice, and a valve (such as the valve 202 in FIG. 2) can generally be considered an orifice with an adjustable size. An orifice has an associated coefficient of velocity $C_v$ (also referred to as a flow coefficient), which denotes the orifice's efficiency in allowing a fluid to flow through the orifice. The coefficient of velocity $C_v$ varies based on the material flowing through the orifice. In the following discussion, it is assumed that gas will be passing through the valve, although any other suitable fluids could be used.

The frictional and miscellaneous head losses in Equations (1) and (2) above can be generally determined from experimental correlations for loss coefficients. The friction loss coefficient is for straight pipe lengths. The miscellaneous loss coefficient accounts for energy loss due to things such as fittings, orifice plates, and valves as a function of their opening or position. These values can be determined experimentally and are often available in tables or other forms from vendors. The flow coefficient of a valve is a measure of its loss coefficient. The process below uses historical data to estimate the loss coefficient between two pressure measurements as a function of the valve opening or position (in the case of a variable position valve). Once the loss coefficient is estimated, the process can be reversed to estimate the flow from the loss coefficient and pressure measurements.

Using known approaches, it is possible to calculate the $C_v$ value for a valve given the flow (q), upstream specific gravity (SG), temperature (T), inlet absolute pressure ($p_i$), and either outlet pressure ($p_o$) for a non-critical flow or pressure recovery factor ($F_L$) for a sub-critical flow. By rearranging the values, it is possible to generate equations that calculate the flow based on (among other things) the coefficient of velocity $C_v$ for the valve. As a particular example, the equations for a gas flow could be expressed as follows:

$$q = \frac{C_v \times \sqrt{dp \times p_o} \times 1360}{\sqrt{SG(T+460)}} \text{ for a non-critical pressure drop} \tag{3}$$

$$q = \frac{C_v \times F_L \times 834}{p_i \times \sqrt{SG(T+460)}} \text{ for a sub-critical pressure drop} \tag{4}$$

where $dp = (p_i - p_o)$. Note that these equations relate to specific units of measure and that other equations relating to other units of measure could be used. Also note that other equations (such as for liquids, saturated steam, super-heated steam, or saturated wet steam) are easily derivable.

Some valve manufacturers identify the coefficients of velocity for their specific valves in the form of curves or tables as a function of valve opening (0°-90° or 0%-100%). Other valve manufacturers may only provide a maximum coefficient of velocity for a specific valve and indicate a characteristic curve (such as linear, equal percentage, etc.), so the coefficient of velocity $C_v$ needs to be calculated at a specific valve position using the curve. Still other valve manufacturers only provide tables with $C_v$ values of their valves corresponding to different valve opening steps (such as ten steps of 10% or four steps of 25%). Thus, the information available for a specific valve may be limited. Moreover, this information often cannot be used directly since the values are typical calculated for a valve under specific laboratory conditions, and those conditions usually do not match the exact conditions in which the valve is actually placed into use. There is also typically no way to predict what the changes to the $C_v$ values will be before the valve is installed and placed into use.

One way to resolve this problem is to calculate the $C_v$ values for a valve that has been placed into actual use for different flow conditions. For example, a long period of time during which the measured flow is deemed valid can be selected, such as based on data stored in the historian 114. During this time, flow measurements, valve positions, and upstream and downstream pressures were recorded, and this data can be used to create a $C_v$ versus valve opening plot. For instance, Equations (3) and (4) above can be rearranged to solve for $C_v$, and the recorded data can be used to calculate the $C_v$ versus valve opening plot. If $C_v$ values can be obtained for only a portion of the total valve opening range (such as for 15% to 40%), the $C_v$ values for the other portion(s) of the total valve opening range (such as for 0% to 15% and for 40% to 100%) could be estimated. In some embodiments, the lower portion of the range (such as 0% to 15%) can be estimated using a linear equation, and the upper portion of the range (such as 40% to 100%) can be estimated using a polynomial equation (such as a third-degree polynomial curve). In other embodiments, the entire range can be estimated using a polynomial equation (such as a third-degree polynomial curve). In still other embodiments, a look-up table could be created, where the desired shape of the curve is created in a table for as many valve positions as possible and then an actual $C_v$ value is obtained by interpolation between two known points.

Once a $C_v$ versus valve opening plot is obtained, the current valve position and the current upstream and downstream pressures can be used to calculate the current flow of material through the valve. For example, the current valve position can be used to identify the current $C_v$ value, and the current $C_v$ value can be used (along with the pressure measurements) to calculate the current flow of material through the valve, such as by using Equation (3) or (4) above. The calculated flow could be compared to the actual flow measured by a flow meter in order to determine whether the flow meter or other component may be suffering from a problem. The calculated flow could also or alternatively be used in place of an actual flow measured by the flow meter. Based on this, the following technique can be used to calculate inferential process flow measurements using upstream and downstream pressure measurements.

Figure 4:
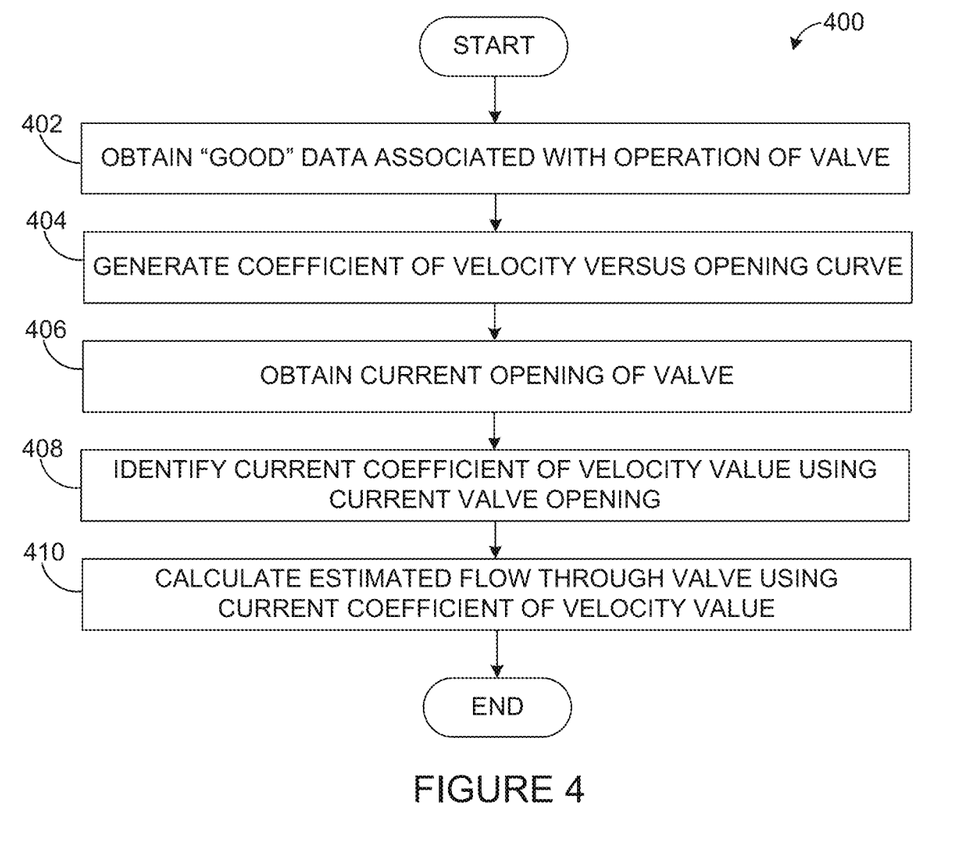
FIG. 4 illustrates an example method for calculating an estimated flow measurement according to this disclosure.

FIG. 4 illustrates an example method 400 for calculating an estimated flow measurement according to this disclosure. For ease of explanation, the method 400 is described as involving the use of the device 300 in FIG. 3 within the systems 100, 200 of FIGS. 1 and 2. However, the method 400 could involve the use of any suitable device in any suitable system.

As shown in FIG. 4, "good" (known valid) data associated with operation of a valve or other flow restrictor is obtained at step 402. This could include, for example, the processor 302 obtaining sensor data from the sensors 210-214. The data can include historical values of upstream and downstream pressure measurements, flow measurements, and valve opening (position) values. The measured values could denote samples captured at the same rate or that are statistically processed to produce a data set sampled equally. The valve opening values could cover all or a significant portion of a valve's operational range (the bigger the range covered, the better). The characteristics of the fluid flowing through the valve during the time(s) that the data is collected should be relatively constant. Equations (3) and (4) (or other suitable equations) could be used to account for this, assuming data is available for temperature and composition to estimate density.

A coefficient of velocity versus opening curve is generated using at least some of the data at step 404. This could include, for example, the processor 302 performing a regression or using a curve-fitting algorithm in order to identify a relation between the $C_v$ values of the valve 202 and the opening or position of the valve 202. As a particular example, this could include the processor 302 identifying one or more transfer functions, linear/polynomial equations, or look-up tables. As noted above, the generation of the $C_v$ versus opening curve may be needed in various circumstances, such as when valve manufacturers provides curves that are calculated for a valve under specific laboratory conditions that might not match the actual operating conditions of the valve. However, these steps could be skipped if a suitable coefficient of velocity versus opening curve has already been obtained.

The current valve opening for the valve is obtained at step 406, and the current coefficient of velocity value for the valve is identified at step 408. This could include, for example, the processor 302 using the $C_v$ versus opening curve to identify the $C_v$ value associated with the current valve opening. The current coefficient of velocity is used to calculate an estimated flow of material through the valve at step 410. This could include, for example, the processor 302 using the current $C_v$ value and Equation (3) or (4) above to identify the estimated flow of material through the valve 202.

While not shown here, the current $C_v$ value could vary based on other factors in addition to the current valve opening or position. For example, the current $C_v$ value could vary based on the composition of the material flowing through the valve and a temperature of the material or the valve. Additional sensors could be used to capture these additional values, and the captured values could be used to calculate or modify the current $C_v$ value.

Note that in the method 400 shown in FIG. 4, it is assumed that the flow restrictor is a valve that has an adjustable orifice. As noted above, however, this need not be the case. For example, a flow restrictor could have a fixed orifice or orifices. In this case, the algorithm above can be modified in that the $C_v$ value may be known, such as based on an analysis of historical data, testing data, or other data. The known $C_v$ value could then be used in a suitable calculation, such as with Equation (3) or (4) above. The $C_v$ value could also still vary based on other factors (such as material composition or temperature), so other measurements could also be used to identify the current $C_v$ value.

Although FIG. 4 illustrates one example of a method 400 for calculating an estimated flow measurement, various changes may be made to FIG. 4. For example, while shown as a series of steps, various steps in FIG. 4 could overlap, occur in parallel, occur in a different order, or occur any number of times. Also, not all of the steps shown in FIG. 4 need to be performed by the same device. For instance, one device could be used to collect the "good" data and generate the coefficient of velocity versus opening curve for a valve 202 or other flow restrictor, and another device could receive and use the coefficient of velocity versus opening curve to estimate flow measurements. In addition, as noted above, the overall loss coefficient could be used for a flow restrictor instead of the coefficient of velocity. In these embodiments, the same approach described above could be used to identify an overall loss coefficient curve for the flow restrictor.

Figure 5:
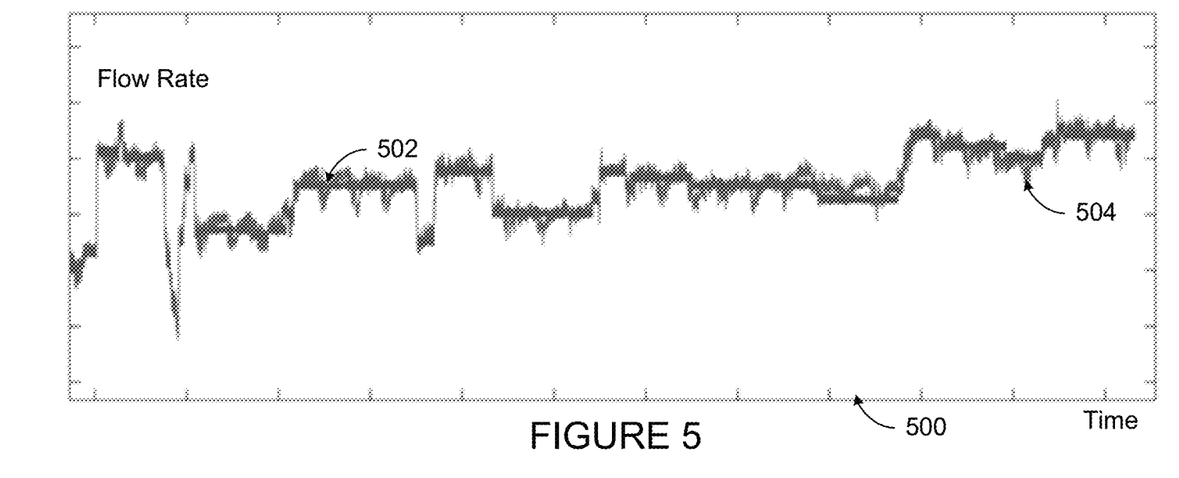
FIGS. 5 and 6 illustrate example results obtained by creating inferential process flow measurements using a flow restrictor and upstream and downstream pressure measurements according to this disclosure.
Figure 6:
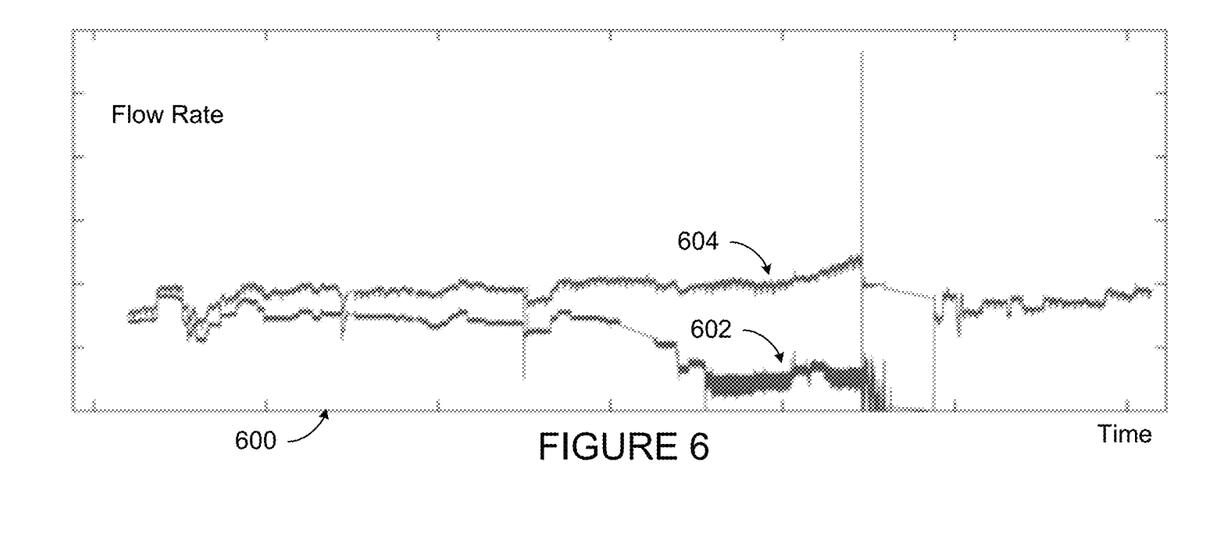

FIGS. 5 and 6 illustrate example results obtained by creating inferential process flow measurements using a flow restrictor and upstream and downstream pressure measurements according to this disclosure. FIG. 5 illustrates an example plot 500 showing a line 502 representing actual flow measurements and a line 504 representing estimated flow measurements. As can be seen in FIG. 5, the line 504 closely tracks the line 502, which indicates that the estimated flow measurements (generated using upstream and downstream pressure measurements) generally track the actual flow measurements (generated by a flow meter). This is indicative of proper operation of the flow meter and other components.

FIG. 6 illustrates an example plot 600 showing a line 602 representing actual flow measurements and a line 604 representing estimated flow measurements. As can be seen in FIG. 6, the line 604 does not closely track the line 602 and actually diverges from the line 602 significantly. This indicates that the estimated flow measurements (generated using upstream and downstream pressure measurements) do not track the actual flow measurements (generated by a flow meter). This may be indicative of improper or defective operation of the flow meter, the pressure sensors, the flow estimation algorithm, or other component(s). Use of the approaches described above can therefore help to identify problems, ideally before any process disruptions, safety issues, or environmental discharges occur.

Although FIGS. 5 and 6 illustrate examples of results obtained by creating inferential process flow measurements using upstream and downstream pressure measurements, various changes may be made to FIGS. 5 and 6. For example, the data in these figures merely represent one example result of using the approaches above and depend on the specific valve being monitored.

Figure 7:
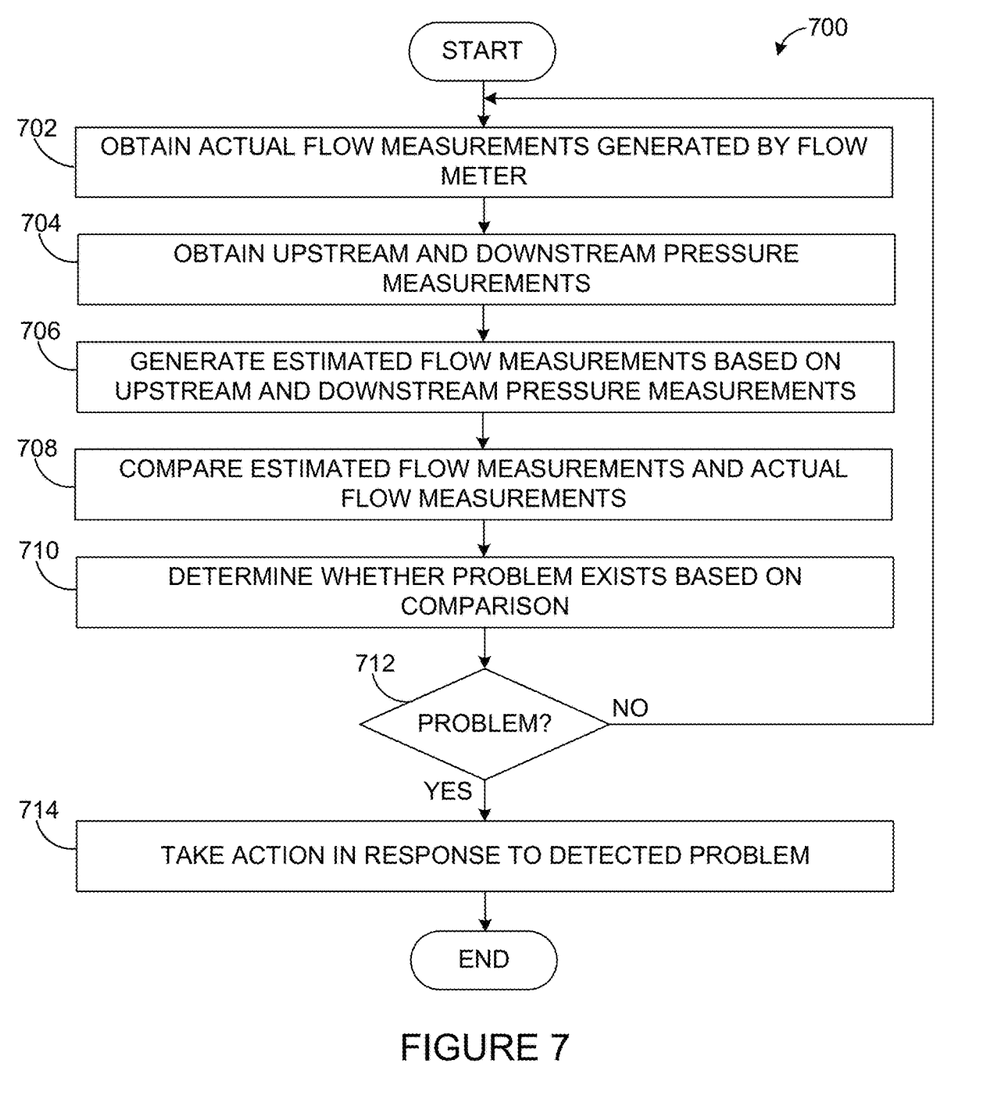
FIG. 7 illustrates an example method for creating inferential process flow measurements using a flow restrictor and upstream and downstream pressure measurements according to this disclosure.

FIG. 7 illustrates an example method 700 for creating inferential process flow measurements using a flow restrictor and upstream and downstream pressure measurements according to this disclosure. For ease of explanation, the method 700 is described as involving the use of the device 300 in FIG. 3 within the systems 100, 200 of FIGS. 1 and 2. However, the method 700 could involve the use of any suitable device in any suitable system.

As shown in FIG. 7, actual flow measurements generated by a flow meter are obtained at step 702, and upstream and downstream pressure measurements are obtained at step 704. This could include, for example, the processor 302 obtaining actual flow measurements from one or more sensors 210. The actual flow measurements identify at least one flow of material in a passageway, such as the pipe 204. This could also include the processor 302 obtaining upstream and downstream pressure measurements from the sensors 212 and 214. The actual flow measurements and the pressure measurements could be obtained at a specified interval, all at once, or at any other suitable time(s).

Estimated flow measurements are generated based on the upstream and downstream pressure measurements at step 706. This could include, for example, the processor 302 using the method 400 shown in FIG. 4 (or at least steps 406-410 in FIG. 4) to generate the estimated flow measurements. The collection of data at step 402 and the generation of the coefficient of velocity versus opening curve at step 404 need not occur as part of the process shown in FIG. 7. Rather, these steps could occur prior to the process shown in FIG. 7 so that the processor 302 has access to the coefficient of velocity versus opening curve during the estimation of the flow measurements.

The estimated flow measurements and the actual flow measurements are compared at step 708, and a determination is made whether a problem exists based on the comparison at step 710. This could include, for example, the processor 302 determining if a mismatch exists between the estimated flow measurements and the actual flow measurements and, if so, whether the mismatch exceeds a threshold. The threshold could represent a threshold amount, a threshold percentage, or other threshold value. This could also include the processor 302 determining if the mismatch persists for a specified amount of time. The specified amount of time could encompass a single actual flow measurement or multiple actual flow measurements.

If it is determined at step 712 that no problem exists, the method 700 returns to step 702 in order to receive and process additional flow and pressure measurements. Otherwise, a problem may exist (either with the flow meter or some other component), and one or more actions can be taken in response to the problem at step 714. This could include, for example, the processor 302 generating a warning or an alarm for presentation to personnel (such as on one or more operator consoles 110) or scheduling equipment maintenance. This could also include the processor 302 updating one or more parameters that are used to generate the estimated flow measurements. This could further include the processor 302 using the estimated flow measurements in place of the actual flow measurements to control an industrial process. One or more other or additional actions could also occur.

Although FIG. 7 illustrates one example of a method 700 for creating inferential process flow measurements using a flow restrictor and upstream and downstream pressure measurements, various changes may be made to FIG. 7. For example, while shown as a series of steps, various steps in FIG. 7 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining pressure measurements associated with fluid that passes through a flow restrictor, the pressure measurements identifying pressures upstream and downstream from the flow restrictor;
generating estimated flow measurements based on the pressure measurements, wherein generating the estimated flow measurements comprises:
identifying current pressure measurements upstream and downstream from the flow restrictor;
identifying a current amount of restriction provided by the flow restrictor;
identifying a current overall loss coefficient for the flow restrictor based on the current amount of restriction,
wherein the current overall loss coefficient for the flow restrictor comprising a valve is identified using a coefficient of velocity versus valve opening or position curve;
comparing the estimated flow measurements and actual flow measurements generated by a flow meter that is fluidly coupled to the flow restrictor; and
determining whether a problem exists based on the comparison.

2. The method of claim 1, wherein:
the valve provides a fixed restriction for the fluid;
the flow restrictor is associated with an overall loss coefficient; and
generating the estimated flow measurements comprises:
identifying current pressure measurements upstream and downstream from the flow restrictor; and
identifying a current estimated flow measurement for the valve based on the current pressure measurements and the overall loss coefficient.

3. The method of claim 1, wherein:
the valve provides a variable restriction for the fluid; and
generating the estimated flow measurements comprises identifying a current estimated flow measurement for the flow restrictor based on the current pressure measurements and the current overall loss coefficient.

4. The method of claim 3, wherein the current amount of the variable restriction comprises a current opening or position of the valve.

5. The method of claim 1, wherein determining whether the problem exists comprises:
determining whether the estimated flow measurements differ from the actual flow measurements by a threshold amount or percentage for a specified amount of time.

6. The method of claim 1, further comprising, in response to determining that the problem exists, at least one of:
generating a warning or an alarm;
scheduling equipment maintenance;
updating one or more parameters used to generate the estimated flow measurements; and
using the estimated flow measurements in place of the actual flow measurements to control an industrial process.

7. An apparatus comprising:
at least one processing device configured to:
obtain pressure measurements associated with fluid that passes through a flow restrictor, the pressure measurements identifying pressures upstream and downstream from the flow restrictor;
generate estimated flow measurements based on the pressure measurements, wherein to generate the estimated flow measurements, the at least one processing device is further configured to:
identify current pressure measurements upstream and downstream from the flow restrictor;
identify a current amount of restriction provided by the flow restrictor;
identify a current overall loss coefficient for the flow restrictor based on the current amount of restriction,
wherein the current overall loss coefficient for the flow restrictor comprising a valve is identified using a coefficient of velocity versus valve opening or position curve;
compare the estimated flow measurements and actual flow measurements generated by a flow meter that is fluidly coupled to the flow restrictor; and
determine whether a problem exists based on the comparison.

8. The apparatus of claim 7, wherein:
the valve provides a fixed restriction for the fluid;
the flow restrictor is associated with an overall loss coefficient; and
to generate the estimated flow measurements, the at least one processing device is configured to:
identify current pressure measurements upstream and downstream from the flow restrictor; and
identify a current estimated flow measurement for the valve based on the current pressure measurements and the overall loss coefficient.

9. The apparatus of claim 7, wherein:
the valve provides a variable restriction for the fluid; and
to generate the estimated flow measurements, the at least one processing device is configured to identify a current estimated flow measurement for the flow restrictor based on the current pressure measurements and the current overall loss coefficient.

10. The apparatus of claim 9, wherein the current amount of the variable restriction comprises a current opening or position of the valve.

11. The apparatus of claim 7, wherein, to determine whether the problem exists, the at least one processing device is configured to determine whether the estimated flow measurements differ from the actual flow measurements by a threshold amount or percentage for a specified amount of time.

12. The apparatus of claim 7, wherein the at least one processing device is further configured, in response to determining that the problem exists, to at least one of:
generate a warning or an alarm;
schedule equipment maintenance;
update one or more parameters used to generate the estimated flow measurements; and
use the estimated flow measurements in place of the actual flow measurements to control an industrial process.

13. A non-transitory computer readable medium containing instructions that when executed cause at least one processing device to:

obtain pressure measurements associated with fluid that passes through a flow restrictor, the pressure measurements identifying pressures upstream and downstream from the flow restrictor;

generate estimated flow measurements based on the pressure measurements, the instructions that when executed cause the at least one processing device to generate the estimated flow measurements comprise instructions that when executed cause the at least one processing device to:

identify current pressure measurements upstream and downstream from the flow restrictor;

identify a current amount of restriction provided by the flow restrictor;

identify a current overall loss coefficient for the flow restrictor based on the current amount of restriction, wherein the current overall loss coefficient for the flow restrictor comprising a valve is identified using a coefficient of velocity versus valve opening or position curve;

compare the estimated flow measurements and actual flow measurements generated by a flow meter that is fluidly coupled to the flow restrictor; and determine whether a problem exists based on the comparison.

14. The non-transitory computer readable medium of claim 13, wherein:

the valve provides a fixed restriction for the fluid;

the flow restrictor is associated with an overall loss coefficient; and the instructions that when executed cause the at least one processing device to generate the estimated flow measurements comprise instructions that when executed cause the at least one processing device to:

identify current pressure measurements upstream and downstream from the flow restrictor; and identify a current estimated flow measurement for the valve based on the current pressure measurements and the overall loss coefficient.

15. The non-transitory computer readable medium of claim 13, wherein:

the valve provides a variable restriction for the fluid; and the instructions that when executed cause the at least one processing device to generate the estimated flow measurements comprise instructions that when executed cause the at least one processing device to identify a current estimated flow measurement for the flow restrictor based on the current pressure measurements and the current overall loss coefficient.

16. The non-transitory computer readable medium of claim 15, wherein the current amount of the variable restriction comprises a current opening or position of the valve.

17. The non-transitory computer readable medium of claim 13, wherein the instructions that when executed cause the at least one processing device to determine whether the problem exists comprise:

instructions that when executed cause the at least one processing device to determine whether the estimated flow measurements differ from the actual flow measurements by a threshold amount or percentage for a specified amount of time.

18. The non-transitory computer readable medium of claim 13, further containing instructions that when executed cause the at least one processing device, in response to determining that the problem exists, to at least one of:

generate a warning or an alarm;

schedule equipment maintenance;

update one or more parameters used to generate the estimated flow measurements; and use the estimated flow measurements in place of the actual flow measurements to control an industrial process.

* * * * *